(12) United States Patent
Suomela et al.

(10) Patent No.: US 8,775,650 B2
(45) Date of Patent: Jul. 8, 2014

(54) MEMORY ASSOCIATION TO FOLDER INFORMATION

(75) Inventors: Mikko Suomela, Vesilahti (FI); Kerem Caglar, Tampere (FI); Jamie McHardy, Hampshire (GB)

(73) Assignee: Core Wireless Licensing S.A.R.L., Luxembourg (LU)

( * ) Notice: Subject to any disclaimer, the term of this patent is extended or adjusted under 35 U.S.C. 154(b) by 1464 days.

(21) Appl. No.: 10/977,272

(22) Filed: Oct. 29, 2004

(65) Prior Publication Data

US 2006/0095537 A1 May 4, 2006

(51) Int. Cl.
*H04W 4/00* (2009.01)
*G06F 15/16* (2006.01)
*G06F 15/177* (2006.01)

(52) U.S. Cl.
USPC .............................. 709/230; 709/222; 370/329

(58) Field of Classification Search
USPC .......................................... 709/217, 222, 230
See application file for complete search history.

(56) References Cited

U.S. PATENT DOCUMENTS

| | | | | |
|---|---|---|---|---|
| 6,202,096 B1* | 3/2001 | Williams et al. | ............. | 709/230 |
| 2001/0010685 A1* | 8/2001 | Aho | ............. | 370/329 |
| 2001/0051981 A1* | 12/2001 | Davison et al. | ............. | 709/203 |
| 2002/0093923 A1* | 7/2002 | Bouet | ............. | 370/328 |
| 2002/0141405 A1* | 10/2002 | Bouet | ............. | 370/389 |
| 2002/0161769 A1* | 10/2002 | Sutinen et al. | ............. | 707/10 |
| 2003/0228888 A1* | 12/2003 | Adamson | ............. | 455/566 |
| 2006/0047837 A1* | 3/2006 | Rissanen | ............. | 709/230 |

OTHER PUBLICATIONS

Pat Megowan, Dave Suvak, Doug Kogan(Counterpoint Systems Foundry,Inc), IrDA Object Exchange Protocol, Mar. 18, 1999, Version 1.2,(pp. 1-85).*
Open Mobile Alliance,Jun. 1, 2004, SyncML Device information, Candidate Version 1.2, pp. 15-25.*
Alex Kanavin, [linux-usb-devel] PATCH:USB CDC OBEX driver, Sep. 25, 2004, http://www.mail-archive.com/linux-usb-devel@lists.sourceforge.net/msg28313.html , pp. 2-5.*

* cited by examiner

*Primary Examiner* — Rupal Dharia
*Assistant Examiner* — Joe Chacko
(74) *Attorney, Agent, or Firm* — Winstead PC

(57) ABSTRACT

A method, device, system, and a computer program product for association of memory to folder information are disclosed. The electronic device includes one or more memory elements and a sending module. Each of the memory elements is adapted to store folders therein, and the sending module is adapted to send a capability object and a folder-listing object to a receiving module. The capability object includes memory information corresponding to the one or more memory elements, and the folder-listing object includes folder information corresponding to a folder contained in one of the memory elements. The folder information includes an attribute identifying the one memory element containing the folder.

26 Claims, 2 Drawing Sheets

MEMORY ASSOCIATION TO FOLDER INFORMATION

FIELD OF THE INVENTION

The present invention relates to data exchange between electronic devices. In particular, the invention provides for association of folder-listing information to corresponding memory devices in the data exchange.

BACKGROUND OF THE INVENTION

Object Exchange Protocol (OBEX) is a data exchange protocol which allows efficient and simple exchange of data or objects between a wide range of devices. For example, OBEX may be used to exchange calendar or contact information between a desktop and a handheld device.

OBEX may also be used within a device to convey system properties of the device to various modules of the device. For example, in a mobile phone, third-party applications may be installed which, due to an unfamiliar operating system, may be unable to directly integrate with the device. Rather, such applications may interact with the operating system or other modules in the mobile phone through OBEX.

Certain electronic devices, such as mobile phones, may include different physical memory areas or memory elements, such as a flash memory and a Multimedia Card (MMC) memory. Information relating to these memory elements can be conveyed through OBEX within the capability object. Meanwhile, an OBEX folder-listing object can convey information relating to a folder residing on one of the memory elements, which may include a logical device or drive.

However, current OBEX objects do not allow association of the folder to its respective memory element. Thus, for example, a PC application on a mobile phone may be unable to provide a user with proper information relating to the memory elements, such as free and used memory in the memory elements, for example.

SUMMARY OF THE INVENTION

The present invention is directed to a method, device, system, and a computer program product where an information exchange between a sending module and a receiving module includes association of folder-listing information to corresponding memory devices.

In one embodiment, a method of information exchange from a sending module to a receiving module includes transmitting a capability object and transmitting a folder-listing object. The capacity object includes memory information corresponding to at least one memory element of a sending device, the sending device containing the sending module. The folder-listing object includes folder information corresponding to a folder contained in one of the at least one memory elements, the folder information including an attribute identifying the memory element containing the folder.

In another embodiment, an electronic device includes one or more memory elements and a sending module. Each of the memory elements is adapted to store folders therein, and the sending module is adapted to send a capacity object and a folder-listing object to a receiving module. The capacity object includes memory information corresponding to the one or more memory elements, and the folder-listing object includes folder information corresponding to a folder contained in one of the memory elements. The folder information includes an attribute identifying the memory element containing the folder.

Another embodiment provides an information exchange system for facilitating exchange of information between a sending module and a receiving module. The system includes a capability object and a folder-listing object. The capability object includes memory information corresponding to at least one memory element of a sending device, the sending device containing the sending module. The folder-listing object includes folder information corresponding to a folder contained in one of the at least one memory elements, the folder information including an attribute identifying the memory element containing the folder.

Other principle features and advantages of the invention will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings, in which.

DETAILED DESCRIPTION OF EXEMPLARY EMBODIMENTS

Figure 1:
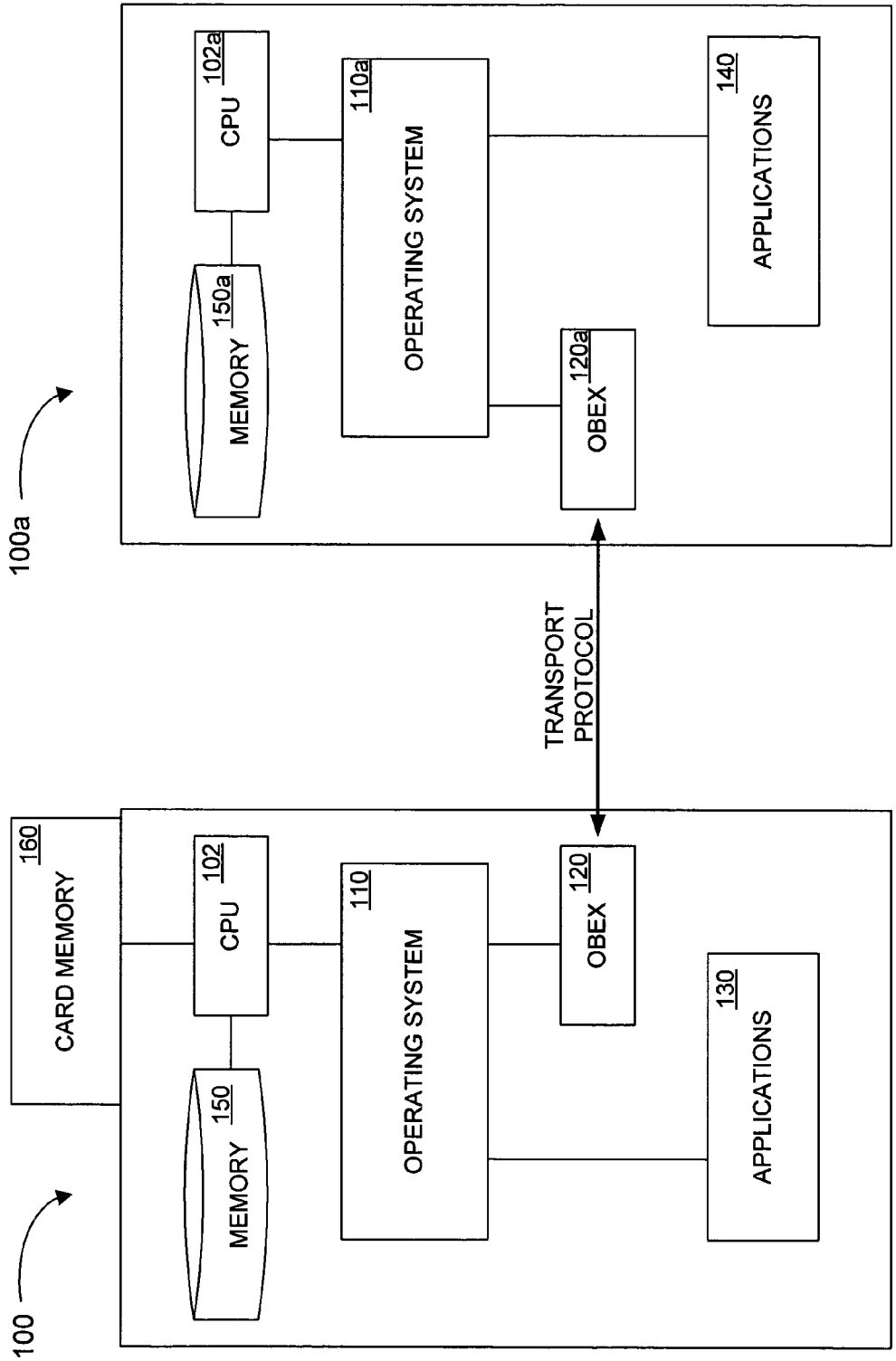
FIG. 1 is a schematic illustration of an embodiment of an electronic device.

FIG. 1 illustrates a system including a device 100 according to an exemplary embodiment. The device 100 can be a phone, a personal digital assistant (PDA), a computer, or any other electronic device. The device 100 includes a central processing unit (CPU) 102 and a memory 150. The memory 150 may be a nonvolatile memory, such as a flash memory device, and may be integrally formed with the device 100. The device 100 may include additional memory elements, such as a removable memory card 160.

The device 100 is provided with an operating system 110 to facilitate operation of the device 100 and the CPU 102. The operating system 110 may be any of a variety of commercially available or proprietary operating systems. In a particular embodiment, the device 100 is a mobile phone, and the operating system 110 is the Symbian operating system. For more information on the Symbian operating system, reference may be made to www.symbian.com. The operating system 110 includes fundamental base services for a device, including various services, libraries, protocols and frameworks.

The operating system 110 facilitates the operation of various applications which may be installed on the device 100. The applications may include a set of applications 130 which may be provided with the operating system 110, or provided separately but interfaceable with the operating system 110.

Additional applications 140 may be provided by third parties and may be installed on an external device 100a and may be accessible by the device 100 through a transport protocol. In this regard, the external device 100a may be provided with similar components as the device 100 described above, such as a CPU 102a, memory 150a and an operating system 110a. Such applications 140 may provide sufficient functionality in the device 100 but may require interfacing with the external device 100a through corresponding information exchange modules 120, 120a. The external device 100a may also comprise additional memory elements (not drawn in the FIG. 1) similar to the device 100.

In one embodiment, the information exchange module 120 operating according to the OBEX protocol. As is generally known in the art, the OBEX protocol is an Object Exchange protocol that uses Request/Response based messages with Headers in the same style as HTTP. OBEX is used as a Session Layer to transport any data type.

The information exchange module 120 is adapted to facilitate exchange of information between a sending module and a receiving module. In the embodiment illustrated in FIG. 1, the sending module may be the CPU 102, the operating system 110, the information exchange module 120, one or more of the set of applications 130 or other components of the device 100. In a particular embodiment, the sending module is the information exchange module 120, through which information relating to other components may be exchanged with the receiving module. In the embodiment illustrated in FIG. 1, the receiving module may be one of the third-party applications 140 or the information exchange module 120a of the external device 100a.

Figure 2:
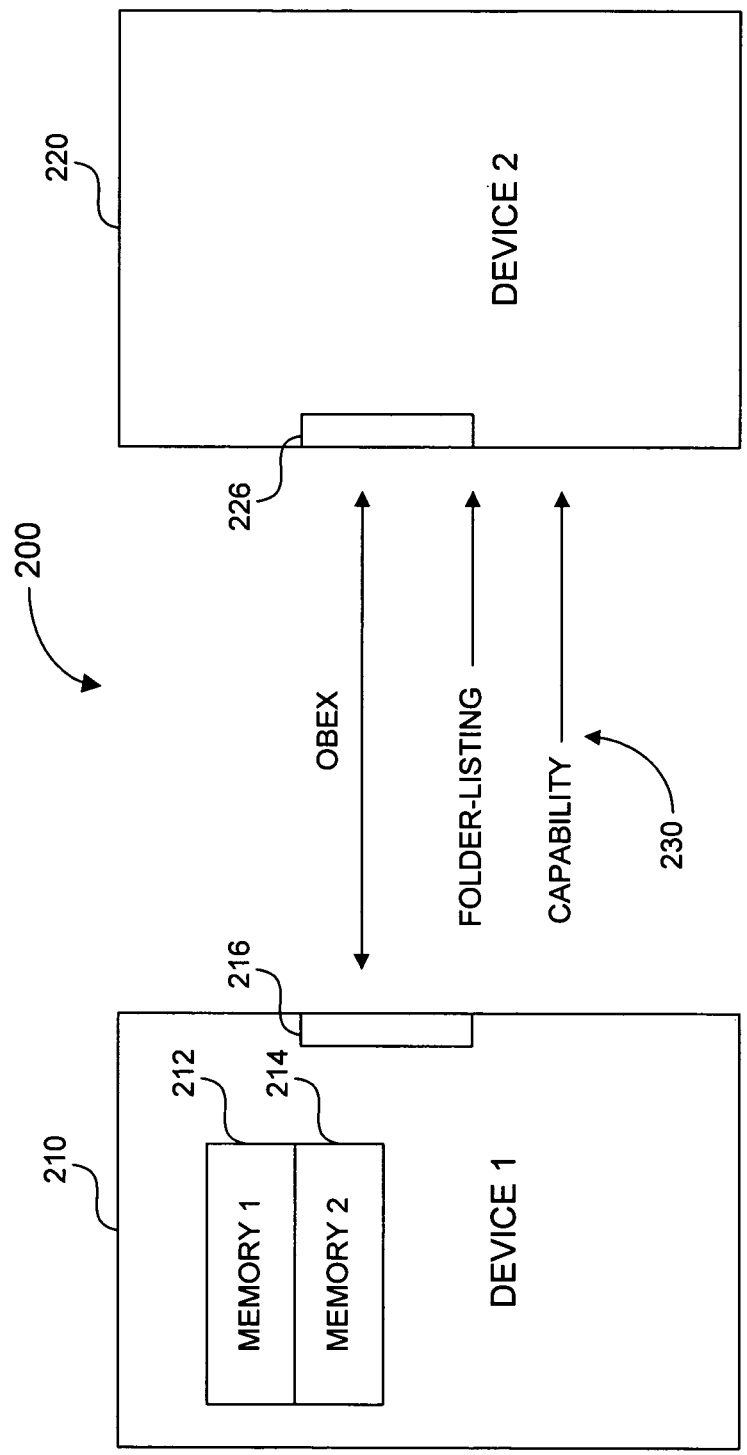
FIG. 2 is a schematic illustration of an embodiment of an information exchange system.

FIG. 2 illustrates an embodiment of an information exchange system. In this system 200, information is exchanged between two devices 210, 220. In this regard, the sending module 216 is positioned in a first device, the sending device 210, while the receiving module 226 is positioned in a second device, the receiving device 220. It is noted that, although the terms "sending device" and "receiving device" are used herein, communication between the two devices may, in fact, require signals to be sent and received by each item. According to one embodiment of the invention, the roles of devices in information exchange may be switched between, i.e. device 220 becomes sending device and device 210 becomes receiving device.

The sending device 210 may include one or more memory elements 212, 214, which may include various types of memory devices. As described above, the memory elements 212, 214 may include flash memory or memory cards or logical drives and devices. The sending device 210 also includes a sending module 216 an information exchange module 216 adapted to facilitate exchange of information 230 with a receiving module 226 in the receiving device 220. As noted above, in a particular embodiment, the exchange of information uses the OBEX protocol.

The exchange of information between the two devices 210, 220 may occur in a variety of manners. For example, the exchange may occur through wireless communication between the two devices. In one embodiment, the information exchange uses, but is not limited to, at least one of the IrDa, USB, RS232 and Bluetooth protocol.

In the exchange of information using the OBEX protocol, within a device as illustrated in FIG. 1 or between devices as illustrated in FIG. 2, information relating to various components is exchanged through capability objects. For example, information relating to two memory elements on the sending device (or the device with the sending module) may be illustrated as:

```
<?xml version="1.0"?>
<!DOCTYPE Capability SYSTEM "obex-capability.dtd">
<Capability Version="1.0">
    <General>
        <Manufacturer>DeviceMaker Inc.</Manufacturer>
        <Model>Handy100</Model>
        <SN>123456789</SN>
```

-continued

```
        <SW Version="2.0"/>
        <HW Version="0505"/>
        <Language>en</Language>
        <Memory>
            <MemType>DEV</MemType>
            <Free>6479872</Free>
            <Used>978944</Used>
            <CaseSenN/>
        </Memory>
        <Memory>
            <MemType>MMC</MemType>
            <Free>16754688</Free>
            <Used>15179776</Used>
            <CaseSenN/>
        </Memory>
    </General>
</Capability>
```

The capability object above is formatted using a syntax based on the XML specification and provides the capabilities of the memory elements. The capability object includes such information as the type of memory element, the amount of free space and the amount of used space.

Information relating to folders residing on the memory elements is exchanged through folder-listing objects transferred through the information exchange module. For example, a folder-listing object may be expressed as:

```
<?xml version="1.0"?>
<!DOCTYPE folder-listing SYSTEM "obex-folder-listing.dtd"
[ <!ATTLIST folder mem-type CDATA #IMPLIED> ]>
<folder-listing version="1.0">
    <folder name="C:" user-perm="R" mem-type="DEV" />
    <folder name="E:" user-perm="R" mem-type="MMC" />
</folder-listing>
```

The folder-listing object above is also formatted according a syntax based on the XML specification and includes information relating to one or more folders residing in the memory elements of the device having the sending module. The information included in the folder-listing object includes the name of the folder and the permissions granted to the user.

Further, as highlighted by the underlined portions, an attribute identifying the memory device type, "mem-type," is included in the folder-listing object. This attribute corresponds to the "MemType" attribute in the capability object. Thus, an association is formed within the information exchange between the memory elements and the folders included in the folder-listing object.

With this association formed in the information exchange, improved capability can be provided to, for example, third-party applications residing on a device. For example, if a PC-based application is installed on a mobile phone using the Symbian operating system, a user is able to obtain memory usage or memory availability information through the PC application.

In the foregoing description, for purposes of explanation, numerous specific details are set forth in order to provide a thorough understanding of the present invention. It is evident, however, to one skilled in the art that the exemplary embodiments may be practiced without these specific details. In other instances, structures and devices are shown in block diagram form in order to facilitate description of the exemplary embodiments.

While the exemplary embodiments illustrated in the Figures and described above are presently preferred, it should be understood that these embodiments are offered by way of example only. Other embodiments may include, for example, different techniques for performing the same operations. The invention is not limited to a particular embodiment, but extends to various modifications, combinations, and permutations that nevertheless fall within the scope and spirit of the appended claims.

What is claimed is:

1. A method for information exchange from a sending module to a receiving module, the method comprising:
   utilizing a processor to complete the following:
   transmitting, using an Object Exchange (OBEX) protocol, at least one capability object, the at least one capability object including memory information corresponding to at least one memory element of a sending device, the sending device containing the sending module; and
   transmitting, using the OBEX protocol, at least one folder-listing object, the at least one folder-listing object including folder information corresponding to a folder contained in one of the at least one memory element, the folder information including an attribute identifying a memory device type corresponding to a memory type attribute in the at least one capability object and associated with the at least one memory element, thereby forming an association between the at least one memory element and the folder.

2. The method of claim 1, wherein the receiving module is disposed within the sending device.

3. The method of claim 2, wherein the receiving module is an application within the sending device.

4. The method of claim 1, wherein the receiving module is disposed within a receiving device adapted to communicate with the sending device.

5. The method of claim 4, wherein at least one of the sending device and the receiving device is a mobile device.

6. The method of claim 5, wherein the mobile device is a portable computer.

7. An electronic device, comprising:
   at least one memory element;
   a sending module configured to use an Object Exchange (OBEX) protocol to send at least one capability object to at least one receiving module, wherein the at least one capability object includes memory information corresponding to the at least one memory element;
   wherein the sending module is a CPU, an operating system, an information exchange module, one or more of a set of applications or other components of the electronic device; and
   the sending module being further configured to use the OBEX protocol to send at least one folder-listing object, the at least one folder-listing object including folder information corresponding to a folder contained in one of the at least one memory element, the folder information including an attribute identifying a memory device type corresponding to a memory type attribute in the at least one capability object and associated with the at least one memory element, thereby forming an association between the at least one memory element and the folder.

8. The electronic device of claim 7, wherein the at least one receiving module is an application within the electronic device.

9. The electronic device of claim 7, wherein the at least one receiving module is disposed within a receiving device adapted to communicate with the electronic device.

10. An electronic device, comprising:
    at least one memory element;
    a sending module configured to use an Object Exchange (OBEX) protocol to send at least one folder-listing object and at least one capability object to at least one receiving module;
    wherein the at least one capability object includes memory information corresponding to the at least one memory element;
    wherein the sending module is a CPU, an operating system, an information exchange module, one or more of a set of applications or other components of the electronic device; and
    wherein the at least one folder-listing object includes folder information corresponding to at least one folder contained in the at least one memory element, the folder information including an attribute identifying a memory device type corresponding to a memory type attribute in the at least one capability object and associated with the at least one memory element, thereby forming an association between the at least one memory element and the at least one folder.

11. The electronic device of claim 10, wherein the at least one receiving module is an application within the electronic device.

12. The electronic device of claim 10, wherein the at least one receiving module is disposed within a receiving device adapted to communicate with the electronic device.

13. A computer program product, embodied on a non-transitory computer-readable medium, comprising:
    computer readable program code for using an Object Exchange (OBEX) protocol to send at least one capability object to at least one receiving module wherein the at least one capability object includes memory information corresponding to at least one memory element; and
    computer readable program code for using the OBEX protocol to send at least one folder-listing object, the at least one folder-listing object including folder information corresponding to a folder contained in one of the at least one memory element, the folder information including an attribute identifying a memory device type corresponding to a memory type attribute in the at least one capability object and associated with the at least one memory element, thereby forming an association between the at least one memory element and the folder.

14. The computer program product of claim 13, wherein the at least one receiving module is an application within an electronic device.

15. A computer program product, embodied on a non-transitory computer-readable medium, comprising:
    computer readable program code for using an Object Exchange (OBEX) protocol to send at least one folder-listing object and at least one capability object to at least one receiving module, wherein the at least one folder-listing object includes folder information corresponding to at least one folder contained in at least one memory element, wherein the at least one capability object includes memory information corresponding to the at least one memory element, the folder information including an attribute identifying a memory device type corresponding to a memory type attribute in the at least one capability object and associated with the at least one memory element, thereby forming an association between the at least one memory element and the at least one folder.

16. The computer program product of claim 15, wherein the at least one receiving module is an application within an electronic device.

17. An information exchange system for facilitating exchange of information including and between at least one sending module and at least one receiving module, comprising:
- a sending device configured to use an Object Exchange (OBEX) protocol to send:
  - at least one capability object including memory information corresponding to at least one memory element of the sending device, the sending device containing the at least one sending module;
  - at least one folder-listing object including folder information corresponding to at least one folder contained in the at least one memory element, the folder information including an attribute identifying a memory device type corresponding to a memory type attribute in the at least one capability object and associated with the at least one memory element, thereby forming an association between the at least one memory element and the at least one folder; and
- a receiving device containing the at least one receiving module, configured to receive the at least one capability object and the at least one folder-listing object.

18. The system of claim 17, wherein the at least one capability object and the at least one folder-listing object are OBEX objects.

19. The method of claim 1, wherein the OBEX protocol uses Request/Response based messages with Headers.

20. The system of claim 17, wherein the OBEX protocol uses Request/Response based messages with Headers.

21. The method of claim 1, wherein:
- the memory information of the at least one capability object comprises information regarding a memory-element type and an amount of free space; and
- the folder information of the at least one folder-listing object comprises information regarding a name and user permissions of the folder.

22. The electronic device of claim 7, wherein:
- the memory information of the at least one capability object comprises information regarding a memory-element type and an amount of free space; and
- the folder information of the at least one folder-listing object comprises information regarding a name and user permissions of the folder.

23. The electronic device of claim 10, wherein the folder information of the at least one folder-listing object comprises information regarding a name and user permissions of the folder.

24. The computer program product of claim 13, wherein:
- the memory information of the at least one capability object comprises information regarding a memory-element type and an amount of free space; and
- the folder information of the at least one folder-listing object comprises information regarding a name and user permissions of the folder.

25. The computer program product of claim 15, wherein:
- the memory type attribute in the at least one capability object comprises information regarding a memory-element type and an amount of free space; and
- the folder information of the at least one folder-listing object comprises information regarding a name and user permissions of the folder.

26. The information exchange system of claim 17, wherein:
- the memory information of the at least one capability object comprises information regarding a memory-element type and an amount of free space; and
- the folder information of the at least one folder-listing object comprises information regarding a name and user permissions of the folder.

* * * * *